United States Patent
Chen et al.

(10) Patent No.: US 10,521,529 B2
(45) Date of Patent: Dec. 31, 2019

(54) SIMULATION METHOD FOR MIXED-SIGNAL CIRCUIT SYSTEM AND RELATED ELECTRONIC DEVICE

(71) Applicant: Realtek Semiconductor Corp., HsinChu (TW)

(72) Inventors: Ying-Chieh Chen, Keelung (TW); Mei-Li Yu, Hsinchu (TW); Ting-Hsiung Wang, Hsinchu County (TW); Yu-Lan Lo, Hsinchu County (TW); Shu-Yi Kao, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 161 days.

(21) Appl. No.: 15/628,636

(22) Filed: Jun. 20, 2017

(65) Prior Publication Data
US 2017/0364619 A1    Dec. 21, 2017

(30) Foreign Application Priority Data
Jun. 21, 2016    (TW) .............................. 105119416 A

(51) Int. Cl.
*G06F 17/50*    (2006.01)
*G01R 31/3167*    (2006.01)

(52) U.S. Cl.
CPC ..... *G06F 17/5022* (2013.01); *G01R 31/3167* (2013.01); *G06F 17/5036* (2013.01)

(58) Field of Classification Search
None
See application file for complete search history.

(56) References Cited

U.S. PATENT DOCUMENTS 6,671,862 B1 * 12/2003 Seward ............... G06F 17/5036
                                                                716/113
6,954,921 B2 * 10/2005 Hassibi ............... G06F 17/5063
                                                                716/103

(Continued)

FOREIGN PATENT DOCUMENTS

TW        552535        9/2003
TW        I521220 B     2/2016

OTHER PUBLICATIONS

P. Yang, "Simulation and Modeling: The Macro-Modeling of Logic Functions for the SPICE Simulator," Circuits and Devices, Sep. 1990, pp. 11-13. (Year: 1990).*

(Continued)

*Primary Examiner* — Leigh M Garbowski
(74) *Attorney, Agent, or Firm* — Winston Hsu

(57) ABSTRACT

A simulation method for a mixed-signal circuit system includes: detecting a plurality of registers and a clock signal included in the mixed-signal circuit system; performing a timing analysis converting operation upon a circuit block coupled between any two register of the plurality of registers to obtain a converted circuit system; and performing a Static Timing Analysis operation upon the converted circuit system; wherein when the circuit block is convertible into a combinational circuit block, the timing analysis converting operation includes: converting the circuit block to the combinational circuit block, wherein the combinational circuit block is logic gate-level.

8 Claims, 5 Drawing Sheets

(56) References Cited

U.S. PATENT DOCUMENTS

| | | | | |
|---|---|---|---|---|
| 7,039,883 B2* | 5/2006 | Krishnamurthy | G06F 17/504 | 703/13 |
| 7,073,141 B2* | 7/2006 | Novakovsky | G06F 17/5022 | 716/103 |
| 7,299,433 B2* | 11/2007 | Clement | G06F 17/5031 | 716/108 |
| 7,401,310 B1* | 7/2008 | Thaden | G06F 17/5045 | 716/112 |
| 7,941,774 B2* | 5/2011 | Luan | G06F 17/5031 | 703/16 |
| 8,201,137 B1* | 6/2012 | Bhushan | G06F 17/5036 | 703/13 |
| 8,255,191 B1* | 8/2012 | Kolpekwar | G06F 17/5022 | 324/651 |
| 8,578,322 B2* | 11/2013 | Bhushan | G06F 17/5036 | 716/100 |
| 8,661,402 B2* | 2/2014 | Bhushan | G06F 17/5036 | 703/14 |
| 9,183,332 B2* | 11/2015 | Ferguson | G06F 17/5036 | |
| 9,760,672 B1* | 9/2017 | Taneja | G06F 17/5081 | |
| 2007/0244686 A1* | 10/2007 | Chang | G06F 17/5036 | 703/19 |
| 2014/0325460 A1* | 10/2014 | Ferguson | G06F 17/5036 | 716/103 |

OTHER PUBLICATIONS

J.-Y. Chen et al., "Automatic Behavioral Model Generator for Mixed-Signal Circuits Based on Structure Recognition and Auto-Calibration," ISOCC 2015 IEEE, pp. 3-4 (Year: 2015).*

Y.-J. Lin et al., "Automatic Mixed-Signal Behavior Model Generation Environment," VLSI-DAT 2016 IEEE, 4 pages. (Year: 2016).*

* cited by examiner

SIMULATION METHOD FOR MIXED-SIGNAL CIRCUIT SYSTEM AND RELATED ELECTRONIC DEVICE

BACKGROUND OF THE INVENTION

1. Field of the Invention

The present invention relates to a simulation method, and more particularly, to a simulation method for a mixed-signal circuit and a related electronic device.

2. Description of the Prior Art

Static Timing Analysis (STA) is an operation process for calculation and prediction regarding the timing of a digital circuit. In the field of circuit design, STA has been a mainstream technology for decades, as it can measure timing rapidly and accurately. Modern technology has developed a mature timing engine for digital circuits which can directly perform STA upon standard elements in the digital circuit. Regarding analog circuit systems, such as mixed-signal circuit systems, which include digital circuit blocks including registers or flip flops, however, there is no analyzing tool which can perform STA. In the prior art, if STA needs to be performed upon a mixed-signal circuit system, the whole circuit system should considered for the simulation, and predetermined values are inputted into the registers and the flip flops to observe if there is STA violation. This method, however, requires a lot of time. Another conventional solution extracts the path between two registers in a mixed-signal circuit system and performs simulation regarding the path. This method, however, cannot take account of load from other paths or any effect caused by other circuits into consideration, and also ignores the electrical drift effect in advanced processes. The simulation results are therefore inaccurate.

SUMMARY OF THE INVENTION

One of the objectives of the present invention is to provide a simulation method for a mixed-signal circuit system and a related electronic device to solve the abovementioned problems.

According to an embodiment of the present invention, a simulation method for a mixed-signal circuit system is disclosed, comprising: detecting locations of a plurality of registers and a clock signal in the mixed-signal circuit system; performing a timing analysis converting operation upon a circuit block coupled between any two registers of the plurality of registers to obtain a converted circuit system; and performing a Static Timing Analysis (STA) operation upon the converted circuit system; wherein when the circuit block is convertible into a combinational circuit block, the timing analysis converting operation comprises: converting the circuit block into the combinational circuit block, wherein the combinational circuit block is logic gate-level.

According to an embodiment of the present invention, an electronic device is disclosed, wherein the electronic device comprises: a processor and a storage device for storing a program code. When the processor loads and execute the program code, the following operations are executed: detecting locations of a plurality of registers and a clock signal in the mixed-signal circuit system; performing a timing analysis converting operation upon a circuit block coupled between any two registers of the plurality of registers to obtain a converted circuit system; and performing a Static Timing Analysis (STA) operation upon the converted circuit system; wherein when the circuit block is convertible into a combinational circuit block, the timing analysis converting operation comprises: converting the circuit block into the combinational circuit block, wherein the combinational circuit block is logic gate-level.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
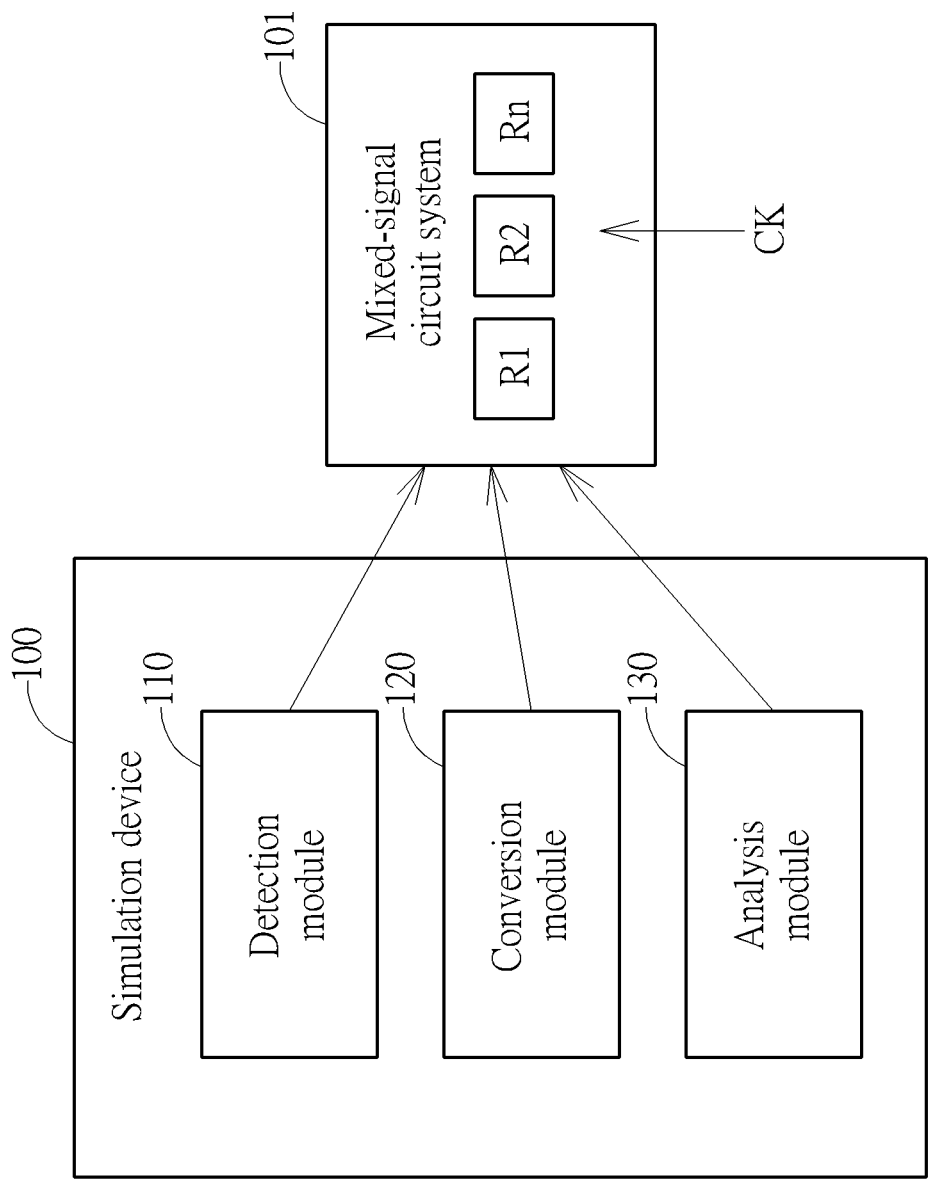
FIG. 1 is a diagram illustrating a simulation device applying a simulation method to a mixed-signal circuit system according to an embodiment of the present invention.

FIG. 1 is a diagram illustrating a simulation device 100 applying a simulation method to a mixed-signal circuit system 101 according to an embodiment of the present invention. As shown in FIG. 1, the simulation device 100 comprises a detection module 110, a conversion module 120 and an analysis module 130, wherein the detection module 110 is arranged to detect locations of a plurality of registers R1 to Rn and a clock signal CK in the mixed-signal circuit system 101. In an embodiment, the detection module 110 can detect the locations of the plurality of registers R1 to Rn and the clock signal CK by looking up the netlist of the mixed-signal circuit system 101. The conversion module 120 is arranged to perform a timing analysis converting operation upon all the circuit blocks coupled between any two registers (e.g. between the register R1 and R2 or between the register R1 and Rn) in the mixed-signal circuit system 101 to obtain a converted circuit system. The analysis module 130 is arranged to perform a Static Timing Analysis (STA) operation upon the converted circuit system. In an embodiment, the analysis module 130 can perform the STA operation upon the converted circuit system using a digital circuit timing analysis tool.

Figure 2:
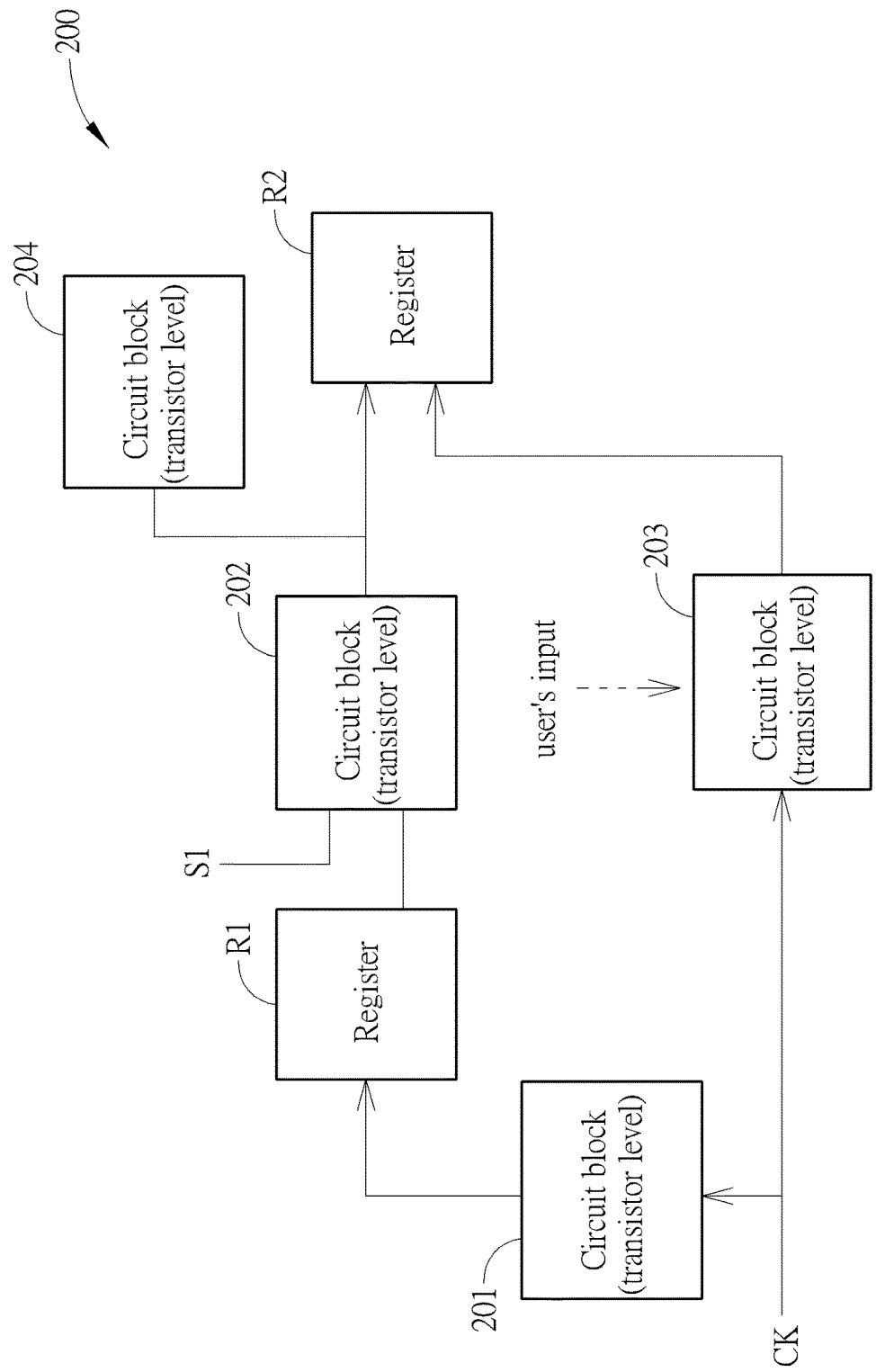
FIG. 2 is a diagram illustrating a mixed-signal circuit system according to an embodiment of the present invention.

FIG. 2 is a diagram illustrating a mixed-signal circuit system 200 according to an embodiment of the present invention. As shown in FIG. 2, the mixed-signal circuit system 200 comprises a clock signal CK, registers R1 and R2, and circuit blocks 201, 202, 203 and 204. It should be noted that the number of the registers in the mixed-signal circuit system 200 is only for illustrative purposes, and not a limitation of the present invention. In other embodiments, the mixed-signal circuit system 200 can comprise one or more registers. In addition, the number of the circuit blocks in the mixed-signal circuit system 200 is also for illustrative purposes. The mixed-signal circuit system 200 may comprise one or more circuit blocks. The circuit blocks 201-204 of the mixed-signal circuit system 200 are analog circuits in transistor-level. For example, the circuit blocks 201-204 may be amplifiers or multiplexers. The actual architecture and function of the circuit blocks 201-204 are not limited in the present invention. In the process of applying the simulation method to the mixed-signal circuit system disclosed by the present invention, the detection module 110 in the simulation device 100 shown in FIG. 1 detects the locations of the registers R1 and R2 and the clock signal CK in the mixed-signal circuit system 200. In practice, the detection module 110 can find the locations of the registers R1 and R2 and the clock signal CK by looking up the netlist of the mixed-signal circuit system 200. Next, the conversion module 120 detects whether the circuit blocks 201-204 coupled between the registers R1 and R2 can be converted into combinational circuits in logic gate-level, and performs a timing analysis conversion operation upon the circuit blocks 201-204. For example, the system can input the logic value 0 or 1 to the circuit block 201, and observe the output result of the circuit block 201 to decide if there is a function of a logic gate-level circuit corresponding to the output result of the circuit block 201. According to the output result, the circuit block 201 can be converted into an equivalent circuit such as a buffer, an inverter, an AND gate, an OR gate or a loading. If the conversion module 120 detects that the circuit block can be converted to a combinational circuit in logic gate-level, the performed timing analysis converting operation can convert the circuit block into the corresponding combinational circuit directly. Otherwise, if the conversion module 120 detects that the circuit block cannot be converted into any combinational circuit in logic gate-level, the timing analysis converting operation comprises setting a timing value for the circuit block via a user's input. For example, if the circuit block 203 is an amplifier, the user can input the period of time in which a signal passes from the input terminal to the output terminal. More specifically, if the conversion module 120 detects that only the circuit block 203 among the circuit blocks 201-204 cannot be converted into a corresponding combinational circuit in logic gate-level, the conversion module 120 converts the circuit block 201, 202 and 204, e.g. the circuit block 201 is converted into a buffer, the circuit block 202 is converted into an AND gate, and the circuit block 204 is converted into a loading. Further, the timing value is set for the circuit block 203 via the user's input. After the timing analysis converting operation is performed for all the circuit blocks, a converted circuit system is obtained.

Figure 3:
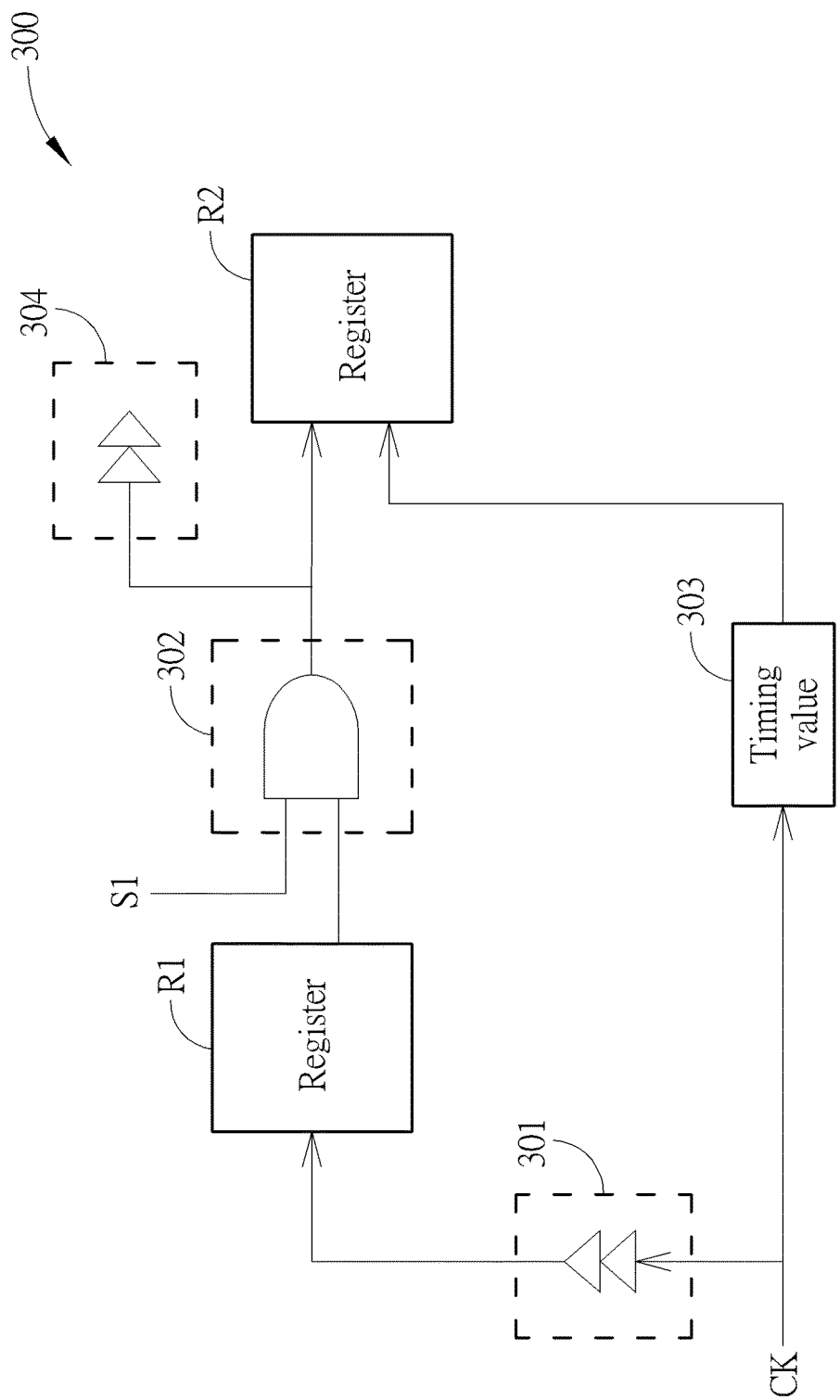
FIG. 3 is a diagram illustrating a converted circuit system according to an embodiment of the present invention.

FIG. 3 is a diagram illustrating a converted circuit system 300 according to an embodiment of the present invention, wherein the circuit blocks 301, 302 and 304 are circuit blocks in logic gate-level generated by converting the circuit blocks 201, 202 and 204, respectively. As mentioned above, the circuit block 301 can be a buffer, the circuit block 302 can be an AND gate which has an input signal S1, and the circuit block 304 can be a loading. This is only for illustrative purposes, however, and the conversion result for each circuit block is not a limitation of the present invention. The circuit block 303 is obtained by setting the timing value for the circuit block 203. As shown in FIG. 3, the converted circuit system 300 only comprises the logic gate-level circuit block 301, 302 and 304, the registers R1-R2 and the timing value; therefore, it can be considered as a digital circuit system. Finally, the analysis module 130 performs the STA operation upon the converted circuit system 300 using a digital circuit timing analysis engine.

Figure 4:
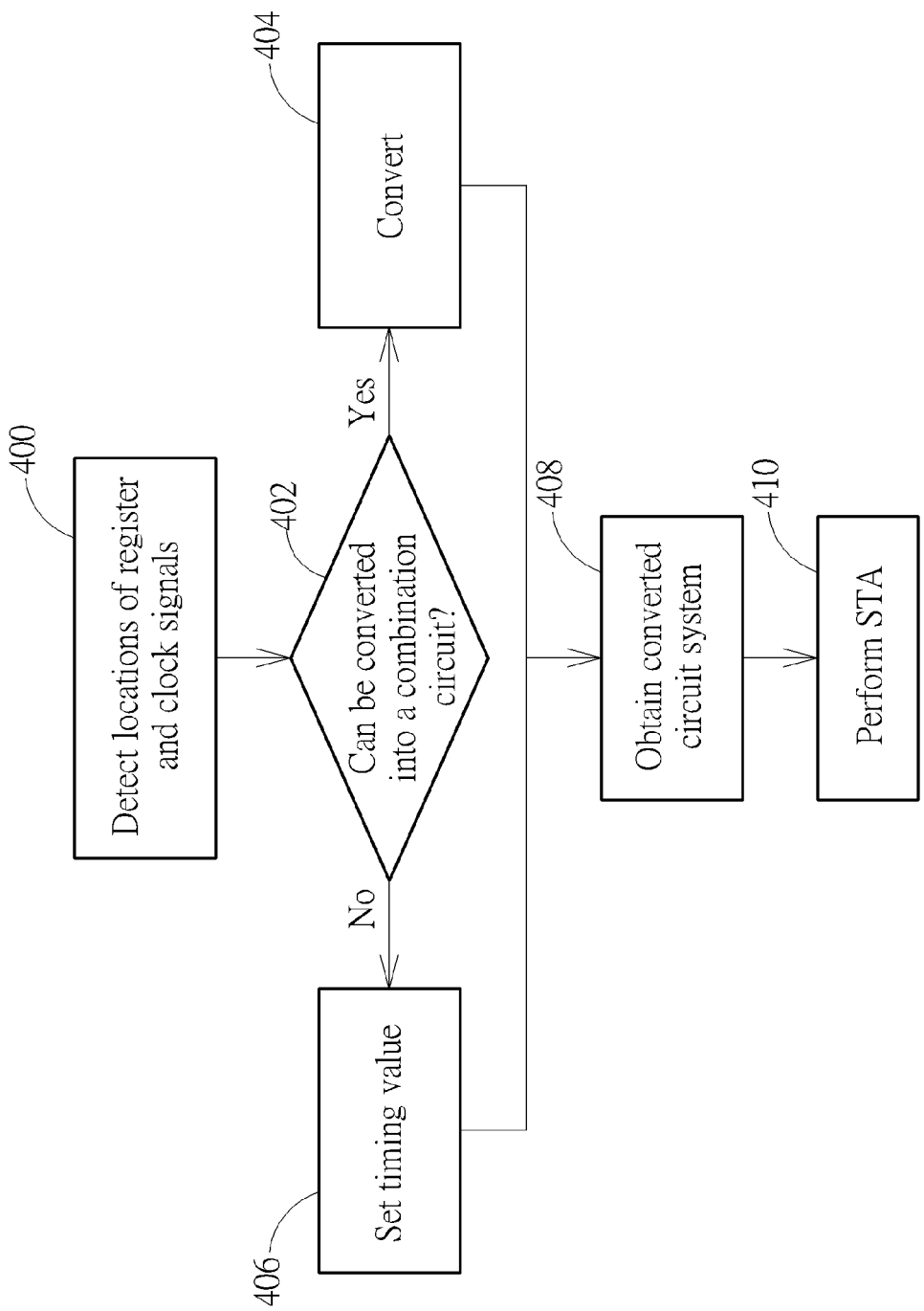
FIG. 4 is a flowchart illustrating a simulation method for the mixed-signal circuit system according to an embodiment of the present invention.

FIG. 4 is a flowchart illustrating a simulation method for the mixed-signal circuit system according to an embodiment of the present invention. Provided that the result is substantially the same, the steps are not required be executed in the exact order shown in FIG. 4. The exemplary simulation method can be briefly summarized as the following steps.

Step 400: detect locations of registers and clock signals in the mixed-signal circuit system.

Step 402: detect if a circuit block coupled between any two registers can be converted into a combination circuit in logic gate-level, if yes, go to step 404; otherwise, go to step 406.

Step 404: convert the circuit block into a corresponding combinational circuit.

Step 406: set a timing value for the circuit block via a user's input.

Step 408: obtain a converted circuit system.

Step 410: perform STA operation upon the converted circuit system.

It should be noted that step 400 is executed by the detection module 110, steps 402, 404 and 406 are executed by the conversion module 120, and step 410 is executed by the analysis module 130. As a person skilled in the art can readily understand details of each step shown in FIG. 4 after reading the above paragraphs, further description is omitted here for brevity.

Figure 5:
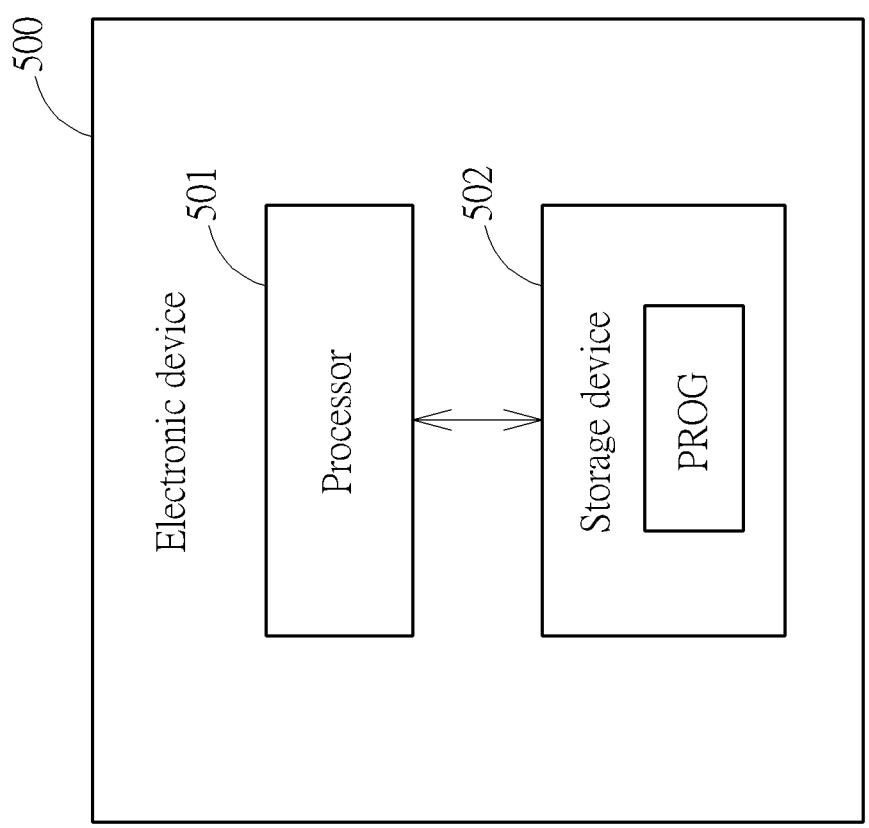
FIG. 5 is a diagram illustrating an electronic device according to an embodiment of the present invention.

FIG. 5 is a diagram illustrating an electronic device 500 according to an embodiment of the present invention, wherein the electronic device 500 comprises a processor 501 and a storage device 502 storing a program code PROG. When the program code PROG is loaded and executed by the processor 501, the steps shown in FIG. 4 are executed. As a person skilled in the art can readily understand the operation of the processor 501 executing the program code PROG, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A simulation method for a mixed-signal circuit system, comprising:
    detecting locations of a plurality of registers and a clock signal in the mixed-signal circuit system;
    according to the locations of the plurality of registers, performing a timing analysis converting operation upon a circuit block coupled between any two registers of the plurality of registers to obtain a converted circuit system, wherein the circuit block is transistor-level; and
    performing a Static Timing Analysis (STA) operation upon the converted circuit system;

wherein when the circuit block is convertible into a combinational circuit block, the timing analysis converting operation comprises:
converting the circuit block into the combinational circuit block, wherein the combinational circuit block is logic gate-level.

2. The simulation method of claim 1, wherein when the circuit block is not convertible into the combinational circuit block, the timing analysis converting operation comprises:
setting a timing value for the circuit block via a user's input.

3. The simulation method of claim 1, wherein the combinational circuit block at least comprises a buffer.

4. The simulation method of claim 1, wherein the combinational circuit block at least comprises an inverter.

5. The simulation method of claim 1, wherein the combinational circuit block at least comprises a loading.

6. An electronic device, comprising:
a processor; and
a storage device, arranged to store a program code, wherein when the program code is executed by the processor, the following steps are executed:
detecting locations of a plurality of registers and a clock signal in the mixed-signal circuit system;
according to the locations of the plurality of registers, performing a timing analysis converting operation upon a circuit block coupled between any two registers of the plurality of registers to obtain a converted circuit system, wherein the circuit block is transistor-level; and
performing a Static Timing Analysis (STA) operation upon the converted circuit system;
wherein when the circuit block is convertible into a combinational circuit block, the timing analysis converting operation comprises:
converting the circuit block into the combinational circuit block, wherein the combinational circuit block is logic gate-level.

7. The electronic device of claim 6, wherein when the circuit block is not convertible into the combinational circuit block, the timing analysis converting operation comprises:
setting a timing value for the circuit block via a user's input.

8. The electronic device of claim 6, wherein the combinational circuit block at least comprises a buffer, an inverter or a loading.

* * * * *